Oct. 14, 1947.  I. W. DOYLE  2,429,051
CAMERA CONE
Filed April 10, 1945  2 Sheets-Sheet 1
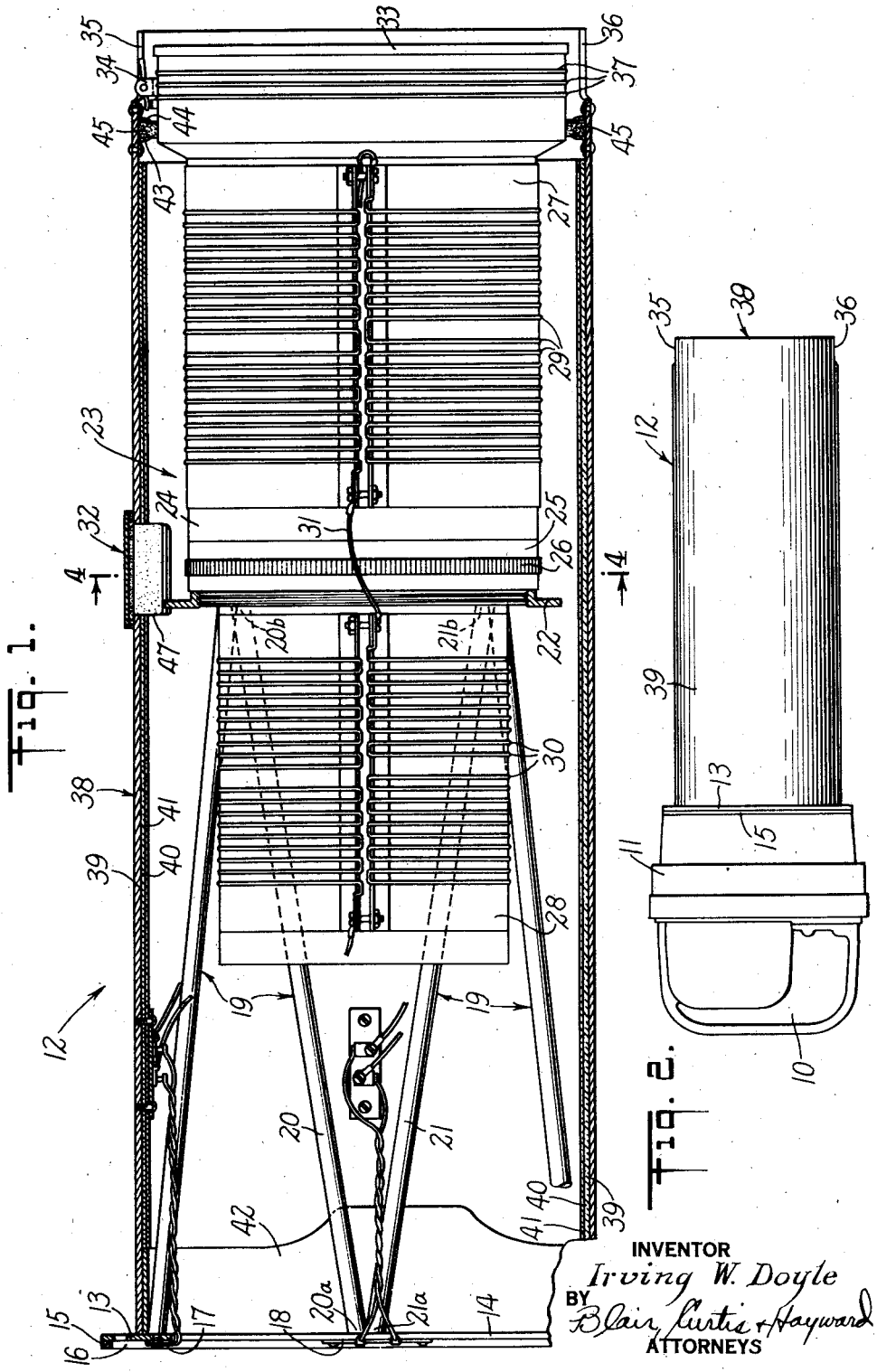
INVENTOR
Irving W. Doyle
BY
Blair, Curtis & Hayward
ATTORNEYS Oct. 14, 1947.   I. W. DOYLE   2,429,051
CAMERA CONE
Filed April 10, 1945   2 Sheets-Sheet 2

INVENTOR
*Irving W. Doyle*
BY
*Blair, Curtis + Hayward*
ATTORNEYS

Patented Oct. 14, 1947

2,429,051

UNITED STATES PATENT OFFICE 2,429,051

CAMERA CONE

Irving W. Doyle, Massapequa, N. Y., assignor to Fairchild Camera and Instrument Corporation, Jamaica, N. Y., a corporation of Delaware Application April 10, 1945, Serial No. 587,501

4 Claims. (Cl. 95—12.5)

This invention relates in general to camera construction, and more particularly to a camera lens cone for aerial cameras.

A variety of cameras has been found necessary to meet the wide range of aerial photographic requirements including small and large vertical scale mapping and reconnaissance photography, rapid action oblique observation spotting and high altitude intelligence photography. For certain types of oblique and high altitude intelligence photography, it is necessary to provide the camera or cameras with lenses of substantial focal length of, for example, forty inches. Where lenses of such focal length are used, it is, of course, necessary to mount them together with other equipment, such as a diaphragm, lenses, heaters and filters within a light-tight cone which is fastened to the body of the camera in such fashion as to maintain proper alignment of the optical axis of the lens with the focal plane. Such a cone accordingly is of substantial length and accordingly very often of such substantial weight as to give rise to a number of problems and difficulties in the use of the camera.

Thus where a camera, including a lens of considerable focal length, is used for oblique photography, the point of attachment of the cone to the camera body is subject to substantial bending and shearing moments which are often intensified to and past a critical point by reason of vibration of the airplane or sudden violent movement thereof, either because of rough air or evasive action. Thus if the cone is not sheared from the camera body, it is not unusual that these violent stresses result in misalignment of the cone and accordingly inaccurate or distorted photographs that are difficult to interpret or are useless.

It is accordingly among the objects of this invention to provide a lens cone construction characterized by a strong, light-weight cone capable of maintaining in proper operative position a large long focus lens. Other objects will be in part apparent and in part pointed out hereinafter.

In accordance with one form of my invention, the lens supporting cone consists basically of a skeleton structure characterized by elongated metal tubing or beams in cantilever arrangement, the beams being attached at one end to a flange or mounting structure adapted to be fastened to the camera, and supporting at the other ends thereof the lens unit assembly; a light, strong and sufficiently long tube or cylinder is disposed about the skeleton structure of the cone and about the various components of the lens unit assembly to protect these various parts, as well as exclude light from the lens.

In the drawing, wherein there is shown one form of my invention;

Figure 1 is a partially fragmentary sectional elevation of the lens cone assembly taken along the line 1—1 of Figure 3;

Figure 2 is a reduced diagrammatic view of an aerial camera having the lens cone mounted thereon;

Similar reference characters refer to similar parts throughout the various views of the drawing.

Figure 3:
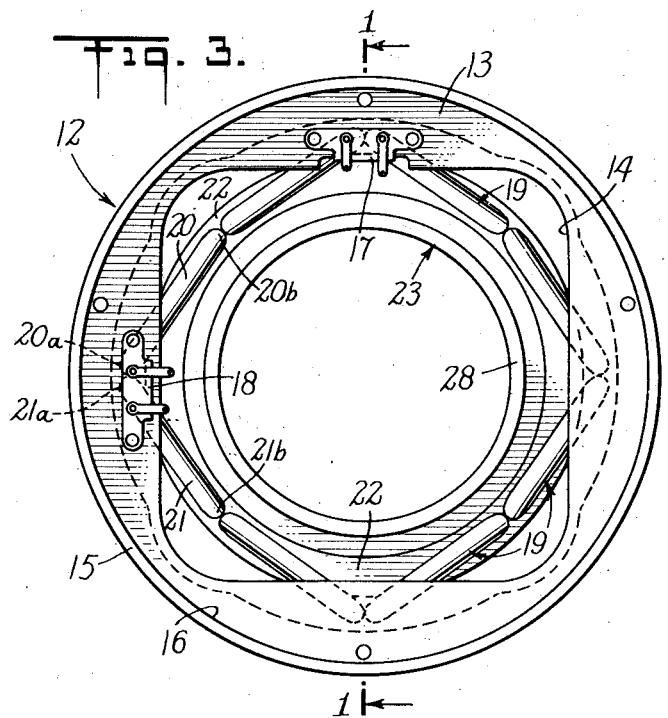
Figure 3 is an elevation of the lens cone as viewed from the left-hand end of Figure 1; and, Figure 4 is a fragmentary section taken along the line 4—4 of Figure 1.

Referring first to Figure 2, I have shown an aerial camera comprising a magazine 10, a body 11 and a cone generally indicated at 12 including a flange or mounting plate 13 by which the cone is fastened to body 11. As is more clearly shown in Figure 3, flange or mounting plate 13 may be circular and may be provided with a substantially squared aperture 14. As shown in Figure 1, a spacer ring 15 is preferably secured to the inside of mounting plate 13 to form a shallow annular recess 16 for the accommodation of contact plates 17 and 18, the purpose of which will be described hereinbelow.

As noted hereinbefore, the supporting capacity of cone 12 is provided by a skeleton construction comprising a plurality of metal tubes or beams generally indicated at 19. I have illustratively disclosed this skeleton structure as comprising eight beams, but it will be understood that more or less may be used as circumstances or requirements dictate. These beams are conveniently arranged in pairs in such a way that at one end of a given pair of beams the ends thereof are adjacent, while at the other extremity of the pair the ends are separated. For example, beams 20 and 21 include ends 20a and 21a, respectively, which are secured to mounting plate or flange 13 as by welding, and are immediately adjacent one another. The opposite ends 20b and 21b of these beams are substantially spaced and are secured as by welding to a lens mounting ring 22. Lens mounting ring 22 is of lesser diameter than mounting plate 13, and as shown in Figure 3 beams 19 converge somewhat from the mounting plate toward the axis of the cone. Thus, each pair of beams as, for example, beams 20 and 21 comprise a V-shaped span, the apex of which is more remote from the axis of the cone than is the base. Thus the beams constitute a type of cantilever support which is extremely rigid, although relatively light in weight, and is accordingly well able to support the relatively heavy lens unit assembly generally indicated at 23 (Figure 1) which is carried by mounting ring 22. It may now be seen that substantially the entire weight of cone 12 is borne by the cantilever beams 19. As viewed in Figure 3, the beams in the lower half of the cone are largely under compression, whereas those in the upper half of the cone are largely under tension by reason of the force of gravity, while each of the beams is under compression or tension at one time or another from stresses resulting from vibration of the airplane, or from forces resulting from sudden, violent movements of the plane during flight. Because, however, the outer ends of the beams (see Figure 1) are nearer to the axis of the cone than are the inner ends thereof, i. e. the left-hand ends, the beams comprise a cantilever construction well able to withstand substantial shearing forces exerted at their points of attachment to the flange.

Lens unit 23 is of more or less conventional character and accordingly comprises a lens system 24, a diaphragm 25, with operating ring 26 and oppositely extending cylinders 27 and 28, on which are mounted lens heaters 29 and 30. These heaters are connected by a jumper wire 31 positioned on the opposite side of the cone from a door generally indicated at 32 which covers an opening in the cone cover. This opening provides access to operating ring 26 of the diaphragm.

The outer end of lens unit cylinder 27 includes structural provisions (not shown) of a conventional nature adapted to detachably receive a filter unit 33 which is detachably secured to the cylinder in any suitable fashion, as by a latch 34, access to which may be had through a cutout 35 in the end of the cone cover, a similar cutout 36 being provided at the bottom of the cone cover to facilitate manual installation and removal of the filter. It may be noted that filter 33 also includes a heater 37 which together with lens heaters 29 and 30 are electrically connected to contact plates 17 and 18.

The cone is provided with a cover which I have generally indicated at 38. This cover comprises an outer light-weight cylindrical shell 39, which is preferably made from fiber, a phenolc condensation compound, wood, or any other suitable light, rigid material. Fastened in any suitable manner to the inside of cover 39 are a pair of insulation shells 40 and 41 which may conveniently comprise a tinfoil lined cork composition, the two shells 40 and 41 being so formed and stapled together that the tinfoil covered surfaces thereof are adjacent. Cover 39 is fastened at its left-hand end, as viewed in Figure 1, to a flange 42 which is firmly attached to and extends axially of mounting plate 13. At its outer or right-hand end, shell 39 has secured thereto a pair of annular brackets 43 and 44 between which is disposed a gasket 45 of felt, sponge rubber or other suitable material, which intimately engages the outer end of lens unit cylinder 27 and accordingly constitutes a light and dust seal, precluding the entrance of light or foreign particles into the lens cone.

Figure 4:
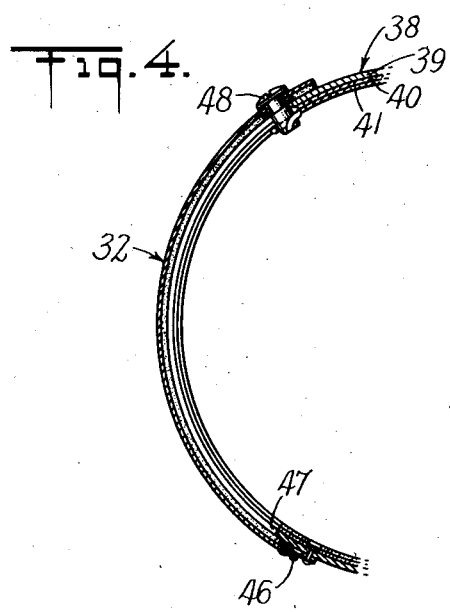

As noted hereinbefore, lens cone 12 is provided with a door 32. As is more clearly shown in Figure 4, this door is hinged as at 46 to shell 39 of cover 38, thus providing a closure for an opening 47 in the cover, through which access may be had to diaphragm operating ring 26 (Figure 1). The upper end of door 32 (Figure 4) is provided with a manually operable latch 48 of any suitable type, by which the door may be held in closed position over opening 47 in cover 38.

It will now appear that the entire weight of lens unit 23 is supported by mounting ring 22 fastened to the outer ends of beams 19, this weight accordingly being transferred to mounting plate 13. Thus it follows that by means of this relatively light-weight supporting structure, the necessity of a heavy metallic shell in the place of the light-weight insulated cover 38 is precluded. Also the lens cone is well able to support a large, long focus lens together with its associated structure which, regardless of the severity of usage to which the camera is put, is well able not only to withstand such usage, but also to maintain the lens in proper operative position relative to the focal plane of the camera. In addition, there is not only a substantial saving of materials effected by the structure hereinbefore described, but also the need for heavy, expensive casting is obviated.

Accordingly I have provided a lens cone which attains the several objects set forth hereinabove in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In camera construction, in combination, a camera body, a frame secured to said body, a plurality of beams secured at one end to said frame and extending outwardly therefrom in the general direction of the optical axis of the camera, a lens mount secured to the other ends of said beams, a lens unit mounted in said lens mount, said lens unit including a central lens supporting structure and heater supporting members extending oppositely therefrom, and an elongated cylindrical cover surrounding said beams and lens unit and engaging but not supporting that one of said lens unit members which extends outwardly of said central lens supporting structure.

2. Apparatus according to claim 1 wherein said beams are so secured to said frame and lens mount as to converge toward the optical axis of the camera.

3. A lens cone for a camera, in combination, an apertured mounting plate adapted to be secured to the body of the camera, a plurality of elongated rigid beams welded to said member and extending outwardly therefrom, a lens supporting member welded to the outer ends of said beams, a lens unit mounted in said supporting member and including a lens barrel extending outwardly therefrom, a flange secured to said mounting plate and extending outwardly thereof, a light-weight non-metallic cylindrical shell secured to said flange and extending outwardly thereof about said beams and said lens unit to form a cover therefor, the diameter of said shell exceeding that of said lens supporting member, and means forming a light and dust seal between the outer end of said shell and said lens barrel at the outer ends thereof.

4. A lens supporting structure for a camera, in combination, a supporting member adapted to be secured to the body of a camera, a second supporting member adapted to receive a lens unit, a lens unit on said second supporting member, elongated cantilever supporting means between said members and secured thereto to maintain said members in substantially rigid immovably attached relationship, said cantilever means comprising a plurality of beams secured at their opposite ends respectively to said members, said beams converging toward the axis of the cone, and a cover member longitudinally coextensive with said beams and lens unit and secured to one of said supporting members but spaced from the other of said members.

IRVING W. DOYLE.

REFERENCES CITED

The following references are of record in the file of this patent:

UNITED STATES PATENTS

| Number | Name | Date |
| --- | --- | --- |
| 589,569 | Meyer | Feb. 8, 1898 |
| 1,295,395 | Wade | Feb. 25, 1919 |
| 1,309,798 | Folmer | July 15, 1919 |
| 2,397,031 | Merritt | Mar. 19, 1946 |